United States Patent [19]

Siarto

[11] 4,356,904
[45] Nov. 2, 1982

[54] MACHINE TOOL

[76] Inventor: Andrew V. Siarto, 46035 Grand River Ave., Novi, Mich. 48050

[21] Appl. No.: 165,426

[22] Filed: Jul. 2, 1980

Related U.S. Application Data

[63] Continuation-in-part of Ser. No. 33,638, Apr. 26, 1979, Pat. No. 4,157,513.

[51] Int. Cl.³ .............................................. B65G 21/00
[52] U.S. Cl. .................................. 198/345; 198/860; 403/335; 403/341; 414/750
[58] Field of Search ............... 198/345, 583, 812, 860, 198/861; 403/294, 335, 339, 341; 74/813 R, 813 C, 813 L, 816-820; 29/38 C; 414/750

[56] References Cited

U.S. PATENT DOCUMENTS

1,802,829  4/1931  Pierce .................................. 403/294
4,257,513  3/1981  Siarto .................................. 198/345

*Primary Examiner*—John J. Love
*Assistant Examiner*—Douglas D. Watts
*Attorney, Agent, or Firm*—Cullen, Sloman, Cantor, Grauer, Scott & Rutherford

[57] ABSTRACT

A machine tool has a circular support including a series of separable sections, with a gear movable thereon and connected to a plurality of spaced workpiece supporting pallets with rollers movably mounted between a plurality of work stations around the support, upon a pair of rails, one rail having a cam surface. A plurality of abutments are mounted on the support at each work station and supportably engage a pallet when at such station, the pallet being anchored to the abutments for machining of a workpiece. The pallet is lifted off the rails when at a work station and solely supported by the abutments. As the pallet leaves a work station, on advancing of the gear, the cam rail lifts one side of the pallet upwardly to a transfer position above the abutments, with the other side of the pallet lowered for engagement with the other rail.

19 Claims, 11 Drawing Figures

MACHINE TOOL

RELATED APPLICATION

This application is a continuation-in-part of my copending patent application Ser. No. 033,638 filed Apr. 26, 1979, now U.S. Pat. No. 4,157,513.

In U.S. Pat. No. 3,609,838, a machine tool is disclosed wherein a pallet is carried by a rotary gear into rough alignment with successive, peripherally spaced machining locations. The pallet is connected to the gear by means of a "spring pack", wherein a spring urges the pallet and the parts loaded on the pallet vertically upwardly into spaced relation above the gear. At the machining location, the gear is halted, and hydraulically actuated clamping devices pull the pallet downwardly relative to the gear and against the load of the spring pack to fix the pallet to a machine base in accurate alignment for machining.

The spring pack must a exert substantial force upwardly to enable the pallet and its load of parts to float above the gear during transport. This spring force must be overcome by the clamping mechanism in order to pull the pallet downwardly into clamped position at each machine station prior to machining. The spring load has proven to be critical in use, and each individual machine tool must be fitted with specific spring packs depending upon the weight of the pallet, the weight and number of the parts to be machined, etc. Additionally, the necessity of overcoming the spring force with the clamping elements reduces the net clamping force securing the pallet in position during machining. It would be desirable from an economic and functional standpoint to eliminate the spring arrangement interposed between the pallet and the carrying gear.

Another prior art machine tool is disclosed in the U.S. Pat. No. 4,130,920 issued to Siarto Machine and Tool Company, Inc., the Assignee of the present application.

In the latter patent, the machine tool includes an annular gear which is rotatable in a horizontal plane and carries a plurality of pallets between adjacent peripherally arranged machine stations. Hydraulic power mechanisms are provided to raise the gear for transport between adjacent stations and to lower the gear for location at each station successively. The pallets are each carried by the gear and are hydraulically locked by the same hydraulic raising and lowering mechanism into finely adjusted position at each machine station by the use of precisely located telescopically interfitting elements on the gear support table and on the pallets respectively. A means was provided for accommodating final adjusting movement of the pallets relative to the gear at each station yet fixing the pallet relative to the gear during transport thereof.

Further examples in the prior art of machine tools of this type are found in the following United States patents:

U.S. Pat. No. 3,336,823
U.S. Pat. No. 3,508,311
U.S. Pat. No. 3,479,712
U.S. Pat. No. 2,392,169
U.S. Pat. No. 2,967,440 and in the West German Pat. No. 2,531,559 dated July 15, 1975.

BRIEF SUMMARY OF THE INVENTION

The present machine tool includes an annular gear which overlies and is spaced from a support which mounts a series of spaced rollers for supporting the gear for rotation about a vertical axis. First and second annular rails are mounted upon the support surface on each side of the gear with the first rail having a cam surface. A pallet for supporting a workpiece and movable through a plurality of work stations upon the support is interconnected with the gear for rotational movement. First and second rollers are carried by the underside of the pallet and are engageable with the rails. A plurality of abutments are mounted upon the support and are engageable with the pallet when at a work station as its sole support, the first and second rollers being spaced from the rails.

A clamping device in said copending application, is carried by the support and is engageable with the pallet for clamping the pallet to the abutments when at a work station. Indexing means rotate the gear moving the pallet between work stations. The cam rail in cooperation with a roller on the pallet lifts the pallet upwardly at one edge to a transfer position at the same time lowering the other rollers to engage the second rail and at the same time lifting the pallet out of engagement with the abutments as the gear is advanced to move the pallet to a next work station.

The indexable gear has the primary function of intermittently advancing the respective pallets from station to station with a flexible connection such as a ball joint connection between the gear and the respective pallets to provide for limited relative vertical and horizontal movements therebetween. At work stations the pallet is solely supported upon the abutments and clamped thereto and independent of and spaced from the rails, and when indexed forwardly of a work station one rail cams and elevates the pallet on one side slightly lowering the support rollers of the pallet upon the opposite side to supporting registry with the other rail at the same time disengaging the pallet from the abutments, which transfer tilted position of the pallet remains until the pallet arrives at the succeeding work stations respectively.

The machine tool support in the illustrative embodiment of the copending Patent application is circular and comprises a series of separable arcuate sectors whose radial ends are arranged end to end and secured together so that the sectors may be stored and shipped in sections and assembled at a point of use.

At each work station there is provided a sub-base upon a floor surface at each station which underlies and mounts the support with the adjacent support sector secured thereto and wherein the assembled support sectors as a unit span the respective sub-bases.

Although the rails could be straight and a gear could be straight, in the illustrative embodiment in the copending Patent application the gear and the rails are circular with each rail and gear comprising a series of arcuate sectors having angular engaging ends which are arranged end to end, aligned and secured together. The rails overlie the support sectors and are secured thereto spanning adjacent sectors and the pallet is adapted for intermittent movement over and upon the rails between work stations.

The sectors which comprise the rails and which span adjacent support sectors have their registering ends displaced and longitudinally staggered with respect to the registering ends of the support sectors as well as the registering ends of the gear sectors.

A wing base is mounted upon the floor surface radially upward of each sub-base at a work station as well as radially inward thereof as desired with each sub-base mounting a radially extending slide unit adapted to support a tool which is movable into operative registry with a workpiece anchored upon a pallet at each station.

In the illustrative embodiment of the copending Patent application each pallet mounts centrally thereof adjacent its opposite ends a pair of longitudinally spaced bushings which are adapted to loosely and cooperatively receive upwardly projecting spaced balls carried by the gear to provide in effect a loose connecting relationship between the gear and the respective pallets to accommodate respective horizontal and vertical movements between the two and particularly of the pallet with respect to the gear as it moves to a work station and as it moves from a work station to and through transfer positions.

When a pallet arrives at a work station the roller depending therefrom which moves along the cam rail loosely nests within a cam recess at the work station so that the pallet tilts slightly about its longitudinal axis resting solely upon the abutments at the work station and at the same time the pair of rollers upon the opposite side of the pallet are lifted slightly above corresponding support rail. Thus during a machining operation at a work station the pallet is raised from the rails with its sole support being upon the abutments. However as the pallet advances from one work station toward the other succeeding station in a transfer movement the cam rail tilts the pallet upwardly on one side and drops the corresponding support rollers upon the opposite side of the pallet into supporting engagement with the second rail at the same time lifting the pallet off the abutments so that the sole support of the pallet is upon the rails during transfer movements.

CONTINUATION-IN-PART

The present application discloses a current operative prototype of machine tool having a number of advantages which are set forth in the following Specification.

These improvements include an improved support construction which consists of a series of separable arcuate support sectors which are arranged end to end in a form of a circle, are laterally interconnected at their ends and are further interconnected by spanner plates. There is an improved cam recess formed in the inner cam rail defined by recessed portions within the spaced ends of a pair of first rails which overlie a support sector at a machine station and wherein the corresponding rails extend beyond the sector and are supported upon and over and are secured to the additional sectors throughout 360°. An improved cam recess construction is applied to the spaced ends of the first rails at each work station at the corresponding support sector.

The roller mounting for the circular drive gear has been improved as has also the supported roller mountings for the pallets on opposite sides thereof and with respect to the support rails for the pallet on opposite sides of the circular gear.

There is an improved flexible connection of the respective pallets with the circular gear for advancing the pallets over the circular support wherein the pallets are capable of transverse movements relative to the driving gear without disconnection therefrom. This is particularly important at work stations and to insure proper registry of the machine tool with a workpiece upon a pallet. A further improvement is defined in the respective supporting backup roller assemblies arranged upon the interior of the circular drive gear spaced throughout its interior perimeter providing adjustable pressure thereto as required.

The respective pallet support abutments at the respective work stations on the adjacent arcuate sector are improved in construction and method of mounting.

Further features of the invention reside in workpiece locators and their construction upon the pallet. There is an improvement in the pallet clamping mechanism anchoring the pallets upon the abutments and off the rails at the work stations. A further improvement resides in the use of rail wipers, which are mounted upon the pallets at the forward ends thereof for preventing accumulation of any particles which might adversely affect the accurate registry of the pallet and the workpiece mounted thereon with respect to a machine tool located at the work stations.

Further feature include the abutment engaging feet and their mounting upon the undersurface of the pallet; the clamping mechanism and specifically, the construction of the clamp projection feet which depend from the pallet and their suspension and securing to the pallet; and the construction of the retractable locator. A flexible adjustable connection is provided between the locating shaft and the axially aligned reciprocal piston rod forming a part of the clamping mechanism. A further feature of the invention resides in the suspension and mounting and supporting of the respective cylinder assemblies which control the pallet clamping locators.

These and other features will be seen in the following Specification and Claims in conjunction with the appended drawings.

It will be understood that the above drawings illustrate merely embodiments of the present improvements, and that other embodiments are contemplated within the scope of the Claims hereafter set forth.

DETAILED DESCRIPTION OF ONE EMBODIMENT OF THE INVENTION

Figures 1, 8, 9, 10, 11:
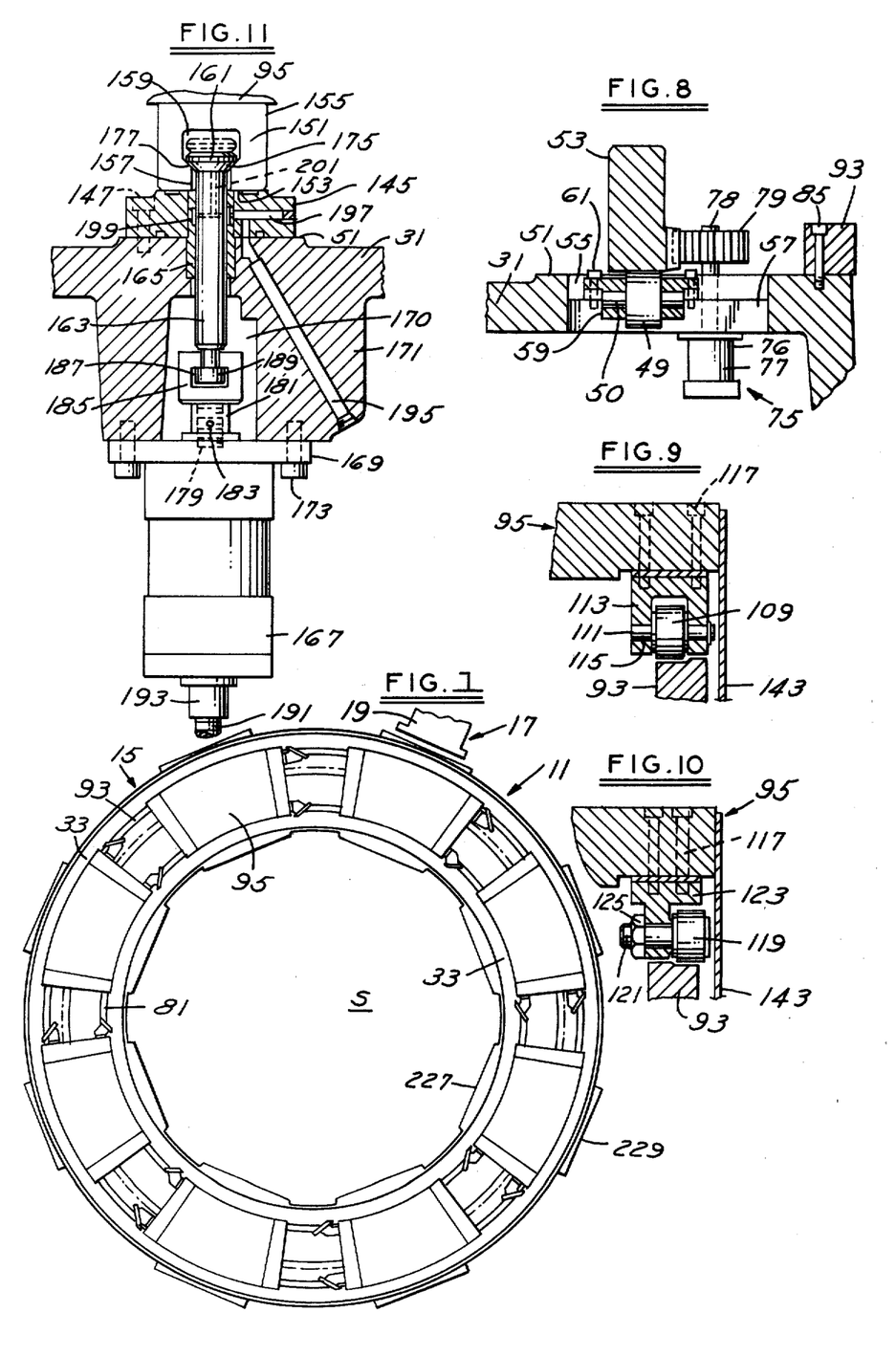
FIG. 1 is a schematic plan view of the present machine tool showing a support having a series of peripherally spaced work stations, and a plurality of spaced pallets movably mounted upon the support.
FIG. 8 is a fragmentary section taken in the direction of arrows 8—8 of FIG. 2, and on an increased scale.
FIG. 9 is a fragmentary vertical section taken in the direction of arrows 9—9 of FIG. 6, and on an increased scale.
FIG. 10 is a fragmentary section taken in the direction of arrows 10—10 of FIG. 6, and on an increased scale.
FIG. 11 is a fragmentary vertical section taken in the direction of arrows 11—11 of FIG. 2, on an increased scale illustrating a portion of the arcuate support sector and the clamping mechanism as well as a fragmentary portion of the overlying pallet.
Figure 3:
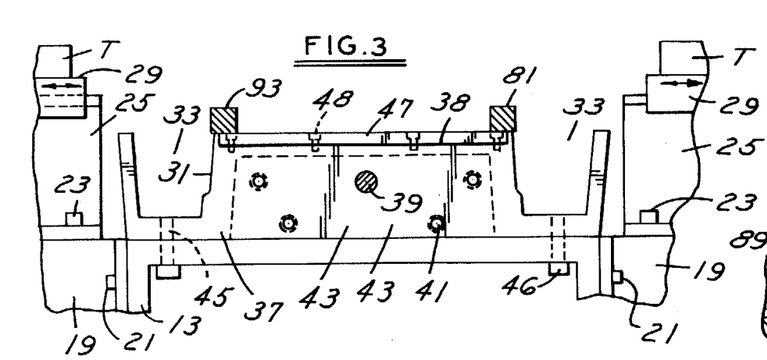
FIG. 3 is a fragmentary section taken in the direction of arrows 3—of FIG. 2.

Referring to the drawings the present machine tool is generally indicated at 11 in FIG. 1 and includes a series of peripherally spaced sub-bases 13 fragmentarily shown in FIG. 3 as mounted upon a floor surface S FIG. 1. A series of circumferentially spaced work stations are designated at 17 FIG. 1 and are spaced around the support 15. Wing bases 19 are mounted upon the floor surface S and arranged radially outward and inwardly of each sub-base, and secured to the floor surface. The wing bases 19 are further secured to the adjacent sub-base 13 by a plurality of fasteners 21, FIG. 3.

Mounted upon each wing base 19 is a radially extending slide unit 25 bolted thereto at 23, having a slide 29 adapted to support a suitable tool T for radial inward and outward movements relative to a workpiece secured upon the respective pallet 95 at a work station 17, FIG. 1.

Figure 2:
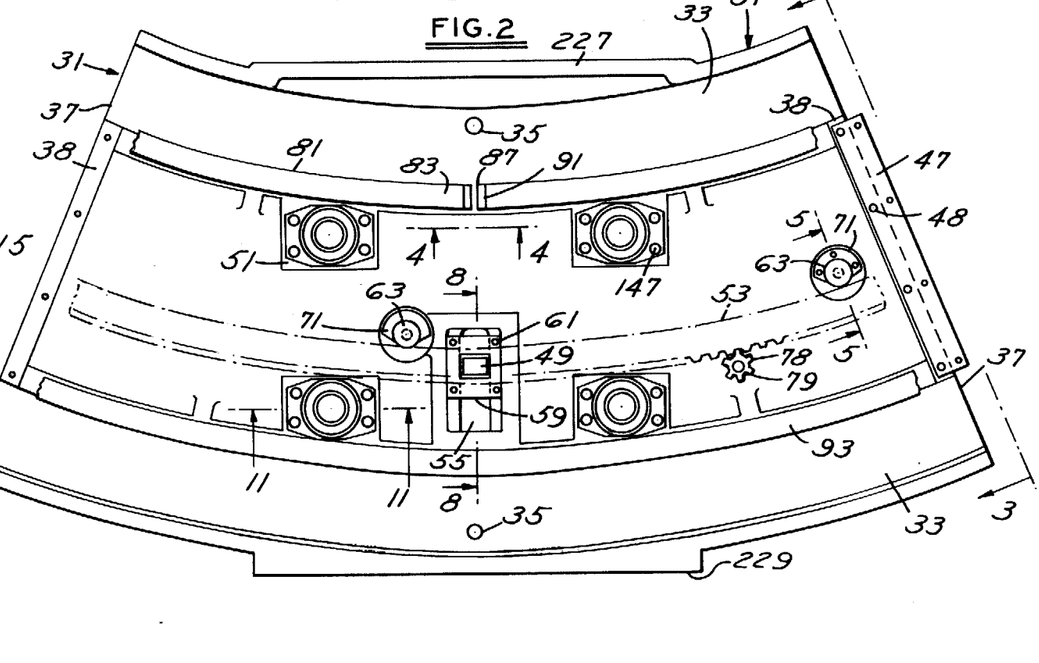
FIG. 2 is a plan view on an increased scale of one of the arcuate sectors making up the support shown in FIG. 1.
Figure 7:
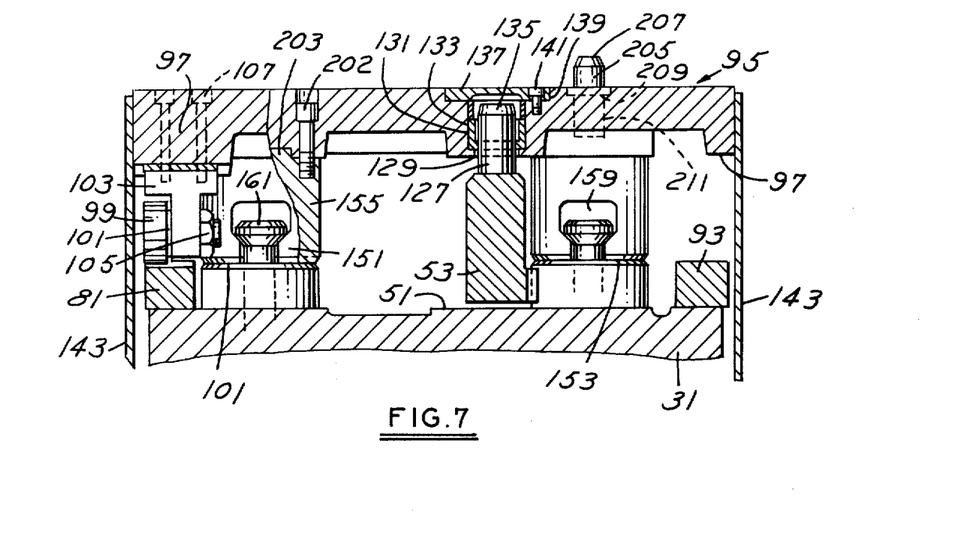
FIG. 7 is a fragmentary vertical section on an increased scale and taken in the direction of arrows 7—7 of FIG. 6 illustrating the pallet construction as well as the corresponding underlying portion of the adjacent arcuate support sector.

Support 15 is circular and has an upper support surface 51, FIG. 7, made up of a series of arcuate support sectors 31, FIGS. 1 and 2, each extending over an arc of 45°, for example.

Each support sector 31 includes a radial end face 37 at its opposite ends, with the end faces of adjacent sectors arranged end to end in a circle. The respective sectors 31 are secured together by a series of fasteners 41 and associated dowels 39 extending through and between adjacent assembly flanges 43 on the ends of the respective sectors 31, FIG. 3.

The assembled sectors 31 as interconnected and secured together are furthermore anchored to the respective sub-bases 13 by a series of dowels 45 and fasteners 46 as shown in FIG. 3. Since the support sectors 31 which make up the circular support 15 are in units they may be stored and shipped in sections and assembled at a point of use upon a suitable floor surface S as shown in FIG. 1.

Within each of the sectors 31 defining the support 15 there are a pair of outer elongated channels 33 which define continuous troughs around the central circular support 15. These are cast as a part of support sectors 31.

Journaled within corresponding radial 55 recesses within support 15 adjacent the support surface 51 are a series of longitudinally spaced rollers 49 on horizontal axles 50. These rollers 49 underlie and supportably engage the annular gear sectors or 53 which is made up of a series of annular gear segments. The registering ends of the gear sectors are tapered and arranged end to end. A plurality of fasteners interconnect the gear sectors. Accordingly, the circular ring gear 53 is spaced above and movably mounted upon the support 15 and rests upon the series of rollers 49.

The support 15 for the machine tool 11 thus consists of a series of interconnected support sectors 31 which overlie and span the respective subbases 13.

Figure 5:
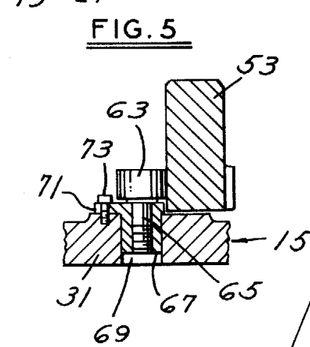
FIG. 5 is a fragmentary section taken in the direction of arrows 5—5 of FIG. 2.

A series of spaced upright backup rollers 63 are each journaled upon support shaft 65 secured at 67, FIG. 5, on support 15 and supportably engage gear 53 upon one side thereof. The rollers 63 guide longitudinal movements of the gear 53 as it advances upon its support rollers 49.

Indexing means 75, FIGS. 2 and 8, are carried by the support 15 for rotating the gear 53 for advancing it over the support 15 upon its rollers 49 and for transfering the pallets 95 to and between work stations 17.

The indexing means 75 includes a motor 77 carried upon the underside of a support sector 31 and includes a drive shaft 78 mounting a pinion 79 in mesh with gear 53. Any suitable power train may be employed between motor 77 and gear 53. In the present instance the power train includes pinion 79 on motor shaft 78 and in mesh with gear 53.

As shown in FIGS. 1–4, 7 and 8 a first annular rail 81, consisting of a series of arcuate rail segments 83, is secured upon support 15 by a plurality of fasteners 85. The ends of the individual rail segments 83 have tapered ends, are arranged end to end, aligned by dowels and secured together by fasteners. First rail 81 has a top cam surface 89 thereon having a rise of 0.020 inches approximately. The first annular rail 81 is arranged upon one side of gear 53. The second annular rail 93 is mounted upon support 15 upon the opposite side of the gear 53 and secured thereto by the fasteners 85, FIG. 8. The second annular rail is of the same construction as the first annular rail 81 and consists of a series of interconnected arcuate rail segments.

Figure 6:
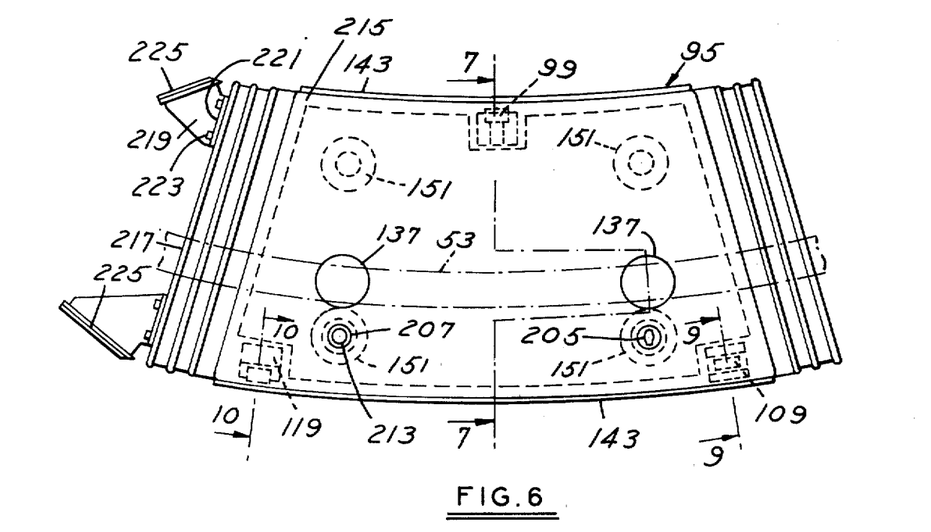
FIG. 6 is a plan view on an enlarged scale of one of the pallets shown in FIG. 1.

Essentially, in the illustrative embodiment, the respective rails 81 and 93 are parallel and circular extending throughout 360° upon the support 15. A plurality of pallets 95, of general arcuate form, are adapted to supportably secure a workpiece which is to be transported between the work stations 17 and has adjacent its opposite sides the depending flanges 97. Each of these flanges 97 support rollers which are movably mounted upon the respective rails 81 and 93 as illustrated in FIGS. 6 and 7. The effective height of rail 93 is less than the height of rail 81, up to 0.02 inches, approximately.

The roller 99, sometimes referred to as first roller means, is journaled upon a transverse horizontal axis upon pallet flange 97 and is arranged intermediate the ends of the pallet on one side thereof, FIG. 6. Upon the undersurface of the pallet 95 upon its opposite side and adjacent the corresponding flange 97 are a pair of rollers 109 and 119, sometimes referred to as second roller means, which are journaled upon the undersurface of the pallet 95 and supportedly engage rail 93 as in FIGS. 9 and 10.

Since the pallets 95 are moved along the rails by the corresponding feed movements of the gear 53, there is provided between the gear 53 and the respective pallets 95, FIGS. 1 and 7 a suitable flexible connection whereby the gear 53 is capable of effecting longitudinal indexing movements of the pallet 95 from station to station upon the support and at the same time the pallet 95 is adapted for relative vertical and horizontal movement with respect to the gear 53.

In the illustrative embodiment this is accomplished by a series of transport pins 127, FIG. 7, which are nested down into the top surface of gear 53 and project above the gear.

In the illustrative embodiment the spacing of the pins 127 is such that a pair of pins coopertively project up into a pair of longitudinally spaced centrally arranged bushings 131 which are nested within the pallet 95 adjacent its ends. Thus there is in effect a loose or swivel connection of the gear 53 and associated pins with respect to the pallets 95 so that the gear 53 is capable of effecting longitudinal arcuate indexing movements of the pallet 95 over the rails but with the pallet 95 adapted for limited tilting movements with respect to the gear.

The pallet 95 has along its opposite sides the depending skirt 143 which extend down into the troughs 33 for the primary purpose of excluding dirt and dust from the interior portions of the pallet 95 and the rollers and other mechanism therein.

At each of the work stations 17 there is provided upon corresponding supported sectors a plurality of laterally spaced abutments 145 which are mounted upon the support surface 51 and suitably secured thereto. Said abutments 145, sometimes are referred to as clamp pads, are engageable with a pallet 95 when at a work station 17. The pallet 95 is supported solely by the abutments 145 and clamped thereon for machining operations at each work station. A series of clamping mechanisms FIGS. 1 and 7 are carried by support 15 and are engageable with the pallet 95 for clamping the pallet to the abutments 145 when at a work station 17.

The engagement of the pallet 95 with the respective abutments includes a plurality of spaced pairs of laterally spaced clamp projection feet 151, FIG. 7, which are secured to and depend from the undersurface of each pallet 95 and which have abutment surfaces 153 at their lower ends adapted for cooperative registry with the abutments 145. The abutments are secured to the sectors 31 by bolts 147, FIG. 11.

The respective clamp projection feet are spaced apart as at 159, FIG. 11, and at their lower ends terminate in the inwardly tapered locating surfaces 177.

The clamping mechanism includes a corresponding series of laterally spaced pairs of locators 161, sometimes referred to as locator heads, which are secured upon the upper ends of the connector rods 163 which extend through the support sector 31. Corresponding cylinders 167 underlie support 15 in alignment with the abutments 145 and are suitably secured to the support. In the normal unretracted position of the locators 161 shown in dash lines, they are so positioned at the work stations 17 that as the pallet 95 advances into registry with the work station 17 they are received within the corresponding slots 159 between the adjacent clamp projection feet 151 as shown in FIGS. 7 and 11.

When a pallet 95 is at the work station 17 the cylinders 167 are activated to retract the corresponding piston rod 179 drawing the locator heads 161 downwardly so that their corresponding lower annular tapered locating surfaces 175 are in frictional securing registry with the corresponding tapered locating surfaces 177 at the lower ends of the clamp projection feet 151, FIG. 11.

Figure 4:
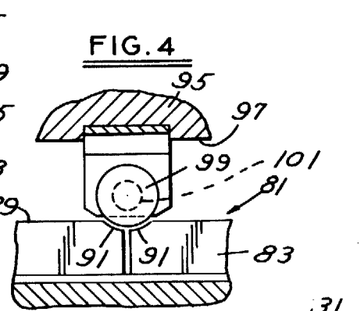
FIG. 4 is a fragmentary section taken in the direction of arrows 4—4 of FIG. 2.

At the time that the pallet 95 is in correct registry at a particular work station 17 upon support 15, roller 99 of the pallet 95 is in registry with cam recess 91, FIG. 4. Thus the corresponding side of the pallet 95 is lowered a slight distance so that the abutment surfaces 153 of the clamp projection feet 151 are supportably engaged upon the abutments 145. This slight dropping of the pallet roller 99 partly down into the cam recess 91 at the same time effects a slight lifting of the rollers 109,119 upon the opposite side of the pallet 95 lifting them a short distance from the corresponding rail 93.

Accordingly the clearance of the rollers 99, 109,119 with respect to the rails 81 and 93 is a limited distance of 0.003 to 0.004 inches approximately.

The spacing is just sufficient so that the pallet 95 while clamped at a work station 17 is solely supported only upon the abutments 145 and clamped thereto and with the corresponding pallet support rollers spaced above the adjacent rails.

After a machining operation of a workpiece upon a respective pallet 95 at a work station 17 as soon as the indexing motor 77 is energized there will be an initial advancing of the gear 53. Successively the first pallet support roller 99 will operatively engage the cam surface 89 of the adjacent cam rail 81 and will tilt the pallet 95 upwardly from the position shown in FIG. 7 a short distance of approximately 0.020 inches corresponding to the cam rise of rail 81. This is referred to as a transfer position and wherein the pallet has been tilted upwardly from its right side. At the same time this upward tilting movement of the pallet with respect to rail 81 causes the support rollers 109,119 upon the opposite side of the pallet to move downwardly a slight distance into operative supporting engagement with the second rail 93. Here the abutment surfaces 153 of the pallet clamp projection feet 151 have been lifted above the abutments 145 a short distance. Accordingly the pallet 95 in its slightly tilted transfer position is supported solely upon the rails 81 and 93 and moves independently of the abutments 145 at each of the work stations.

The positioning of the pallet with respect to a work station 17 is further shown in FIG. 4 with the roller 99 for the pallet loosely nested down into the cam recess 91 and with the result that while the pallet is clamped at the work station, the undersurface of the pallet flange 97 is spaced from rail 81. The spacing upon the opposite side of the pallet of the rollers 109,119 with respect to the rail 93 is approximately 0.003 to 0.004 inches.

CONTINUATION-IN-PART

Much of the foregoing description with some changes in numbers as required was set forth in the earlier copending application Ser. No. 033,638 of which the present application is a continuation-in-part.

Set out hereunder are some specific modifications and depatures from the copending application which are defined in further detail.

With respect to each of the arcuate sectors 31 which are arranged and interconnected there is provided adjacent opposite ends of such sectors and their respective radial end faces 37 recessed radial ledges 38. These recessed ledges overlie the corresponding assembly flanges 43. Radially extending spanner plate 47 is nested down within the adjacent radial recesses 38 between adjacent sectors, bridging the sectors 31 and is secured to the respective sectors 31 by the series of fasteners 48, in FIGS. 2 and 3. Accordingly, the respective spanner plates 47 complete the end to end connection of the respective sectors 31 making up the circular support 15 so that they are effectively secured together end to end.

The respective circular troughs 33 formed on top surface of the sectors 31 are cast as an integral part of the sectors and include drain apertures 35 therein. The troughs 33 serve to collect chip turnings resulting from machining of the work pieces at their respective work stations.

The series of rollers 49 within the respective support sectors 31 movably mount the circular gear 53 above support surface 51 are shown in further detail in FIG. 8.

Adjacent and upon opposite sides of the radial recess 55 formed within support sector 31 intermediate its ends are a pair of opposed spaced radial ledges 57. The axle support 59 spans the ledges 57 and is secured thereto by the fasteners 61 and depends down into recess 55.

Transverse radially extending axle shaft 50 extends through the axle support 59 and is mounted thereon, and journaled within is the axle support 59 is gear supporting roller 49. Thus the axle support 59 and the gear support roller 49 is adjustably mounted upon the radial shoulders or ledges 57 and secured thereto for support registry with the undersurface of the circular feed gear 53.

The detail of construction of the backup roller 63 for the ring gear 53 is further shown in FIG. 5. The support shaft 65 for the backup roller 63 is nested down within a cylindrical roller mount 67 which is projected down into the bore 69 of support sector 31. Arcuate mount plate 71 overlies support sector 31 and is adjustably secured thereto by a series of fasteners 73. By this construction, the backup roller 63 may be radially adjusted providing the correct amount of supporting backup pressure against the interior surface of the continuous pallet drive gear 53, FIGS. 2 and 5.

The indexing means generally indicated at 75, FIG. 8, includes a motor 77, such as a hydraulic motor or an air motor having a mount flange which engages the undersurface of support sector 31 and is suitably secured thereto by fasteners 76.

The power transmission includes rotatable drive shaft 78 on which is axially secured pinion 79 which is at all times in mesh with pallet transport gear 53. The accurate location of the respective pallet 95 with a mounted workpiece at the work station 17 is achieved by the pallet support first roller 99 moving into registry with cam recess 91, FIG. 4, formed into the registering but spaced ends 83 of the first annular rail 81. When the pallet 95 has moved so that its roller 99 is in vertical registry with cam recess 91, the feed gear 53 is automatically stopped such as by a limit switch or other electrical connection. At such station, the loaded pallet 95 will tip downwardly a short distance approximately 2 to 4 thousandths of an inch, so as to be loosely disposed within the cam recess 91. It is this downward movement, the pallet 95 on its right side which causes the abutment surfaces 153 on the clamp projection feet 151 to be in operative supported engagement with the respective abutments 145. This slight downward movement of the roller 99 with respect to the cam recess 91 also causes a limited lifting of the respective second rollers 109 and 119. There are spaced slightly above the corresponding second rail 93, a distance of approximately 2 to 4 thousandths of an inch.

The specific mounting of the first roller 99 for the pallet 95 is shown in detail in FIG. 7 and wherein roller 99 is journaled upon axle shaft 101 upon a transverse or radial axis and secured to the T-shaped roller support 103 as by fastener 105.

The T-shaped roller support 103 bears against the undersurface of the flange 97 depending from one side of pallet 95 and is secured thereto by a plurality of fasteners 107, FIG. 7.

With respect to the second rollers 109, FIG. 9, and 119 FIG. 10, also shown in FIG. 6, the first of the second rollers 109 is journaled upon radial axle shaft 111 which extends through the inverted U-shaped roller support 113. Its knurled end 115 is anchored within the support 103 and journals the roller 109 therein.

Roller 109 is adapted for supporting engagement of the pallet 95 with respect to the inner side of rail 93 as viewed in FIG. 9. It appears however, in FIG. 9, that the first of the second rollers 109 is spaced slightly above top surface of the second rail 93. This corresponds to the position the roller 109 would take when the pallet 95 is at a work station 17 and is directly supported upon the abutments. At that time, the respective rolles are spaced above the corresponding support rails. The U-shaped roller support 113 underlies the pallet 95 and is secured thereto by a plurality of fasteners 117.

The second of the second rollers 119, also referred to as second roller means, is journaled upon radial axial shaft 121 which extends through the T-shaped roller support 123 and is secured thereto by fastener 125. The T-shaped roller support 123 underlies an edge portion of pallet 95 and is secured thereto by the plurality of fasteners 117.

A plurality of spaced upright transport pins 127 are nested down into the gear 53 as in FIG. 7 and project above the gear 53 for a loose cooperative engagement with the pallet 95 for effecting longitudinal feed movements of the pallet 95 over the rails. The construction is such that the pallet is capable of limited transverse tilting movements with respect to the pins 127, at the same time maintaining a longitudinal drive connection between the pins, the feed gear 53 and the respective pallets 95 so that they move simultaneously around the support 15 in the manner shown in FIG. 1.

The pin 127 extends upwardly through bore 129 in the pallet 95 and into the counter-bore 131 therein and within the bushing 133 located in the counterbore 131. Spacer ring 135 overlies the bushing 131 and is held down in place by the cover disc 137 which is nested within recess 139 on the top surface of the pallet 95. The plate 137 is secured to the pallet 95 by fastener 141.

The respective abutments 145, also referred to as clamp pads, are arranged in laterally and longitudinally spaced pairs, overlie the support surface 51 of the arcuate support sector 31 corresponding to a workstation and are secured thereto by a series of fasteners 147, FIGS. 2 and 11.

The clamp projection feet 151 depend respectively from annular body 155. The recess 159 between the clamp projection feet 151 terminates in the bore 157 to provide clearance for locator 161 and the depending connector rod 163, FIG. 11.

Upright bushing 165, supported within support sector 31, extends up through the abutment 145 and is adapted to cooperatively and slidably receive rod 163 which depends from the locator 161.

Formed upon the undersurface of the support sector 31 are a plurality of depending bosses 171 which are cast as a part of the support 31.

Air cylinder 167 has a mounting flange 169 which underlies the respective boss 171 and is secured thereto by a plurality of fasteners 173, FIG. 11. Reciprocal piston rod 179 projects from the cylinder 167 and into the bore 170 within the boss 171 boss. Piston rod 179 extends into sleeve 181 and is secured adjustably thereto by the pin 183. Sleeve 181 axially depends from cup 185 which has an undercut slot 187 therein and receives the head 189 upon the lower end of the rod 163 depending from the locator 161. The cup 185 is movably nested within the bore 170 and provides the connection between the piston rod 179 and locator 161 acting through the connector rod 163. Axial pressure conduit 191 is adapted to direct pressure fluid, such as compressed air, to the fitting 193 and to the interior of the cylinder 167 for effecting reciprical movements of piston rod 179 and and the flexibly connected rod 163 and the locator 161 for movements in unison.

Lubrication passage 195, FIG. 11, communicates with lubrication passage 197 within abutment 145 for communication with the annular groove 199 upon the rod 163 and with the respective radial and axial passages 201.

The upper end of body 155, FIG. 7, terminates in circular upright shank 203 which nests within a corresponding undercut recess within the pallet flange 97 and is secured thereto by fasteners 202.

As shown in FIGS. 6 and 7 there is provided a pair of upstanding locator pins 205 and 213 which are arranged lengthwise of the pallet 95 and suitably secured thereto for registry with corresponding apertures in the workpiece properly locating the workpiece with respect to the pallet.

Upright locator pin 205, FIG. 7, has a taper 207 at its upper end to facilitate assembly with an aperture in the undersurface of a workpiece to be mounted upon the pallet 95. The flange 209 intermediate the ends of the pin 205 is nested within recess on the top surface of the pallet, and the depending portion of the pin 205 extends through the bore 211. As shown in FIG. 6 the locating pin 205 has a transverse longitudinal axis as shown in the plan view. Locator pin 213 is of substantially the same construction and has an annular taper as at 207 for registry with a corresponding aperture on the undersurface of the workpiece on the pallet to be machined.

Referring to FIG. 6 the pallet 95, shown in plan, has an end section 215 which terminates in a radial leading edge 217 upon which are mounted a pair of laterally spaced wiper supports 219. Each wiper support 219 has a mount flange 221 which bears against the leading edge 217 and is secured thereto by the fasteners 223. The end face of each of the wiper supports 219 is upright and lies in a plane at an acute angle with respect to the axis of the respective rails. Upon each end face is mounted a flexible rail wiper 225 suitably secured thereto. The respective wipers project downwardly and wipingly engage leading portions of the respective rails 81 and 93 on forward movement of the respective pallets 95 sweeping off any particles or tunings of metal which may have dropped down upon the rails 81 and 93 keeping the rails clean in advance of movement of the pallet rollers thereover.

As shown in FIG. 2 each of the respective arcuate sectors 31 which make up the circular support 15 when assembled include elongated straight register plate 227 and the exterior straight register plate 229. These are arranged for the purpose of determining straight register surfaces involved in connection with the assembly of the respective wing bases 19 shown in FIG. 3, and may be used in connection with the assembly of the respective wing bases and the associated slide supports 25 in conjunction with the sub-bases 13 as shown.

Having described my invention, reference should now be had to the following claims:

I claim:

1. In a machine tool, a circular support having an upper support surface and comprising a series of separable arcuate sectors with radial ends;
    an annular gear overlying and being spaced from said support surface;
    a plurality of rollers carried by said support and engaging the undersurface of said gear to support the gear for rotation about a vertical axis;
    first and second annular rails on said support surface, one rail on each side of said gear;
    said first rail having a cam surface;
    there being a plurality of spaced work stations located around said support;
    a pallet for supporting a workpiece and movable through said work stations;
    means connecting said pallet to said gear for rotational movement, yet accommodating limited relative vertical and horizontal movement therebetween;
    a first roller carried by the underside of said pallet intermediate its ends on one side thereof and engageable with said first rail;
    a pair of longitudinally spaced second rollers carried by the underside of said pallet adjacent its ends upon the other side thereof and engageable with said second rail;
    a plurality of spaced abutments mounted on said support at each station, and engageable with said pallet when at a work station whereby said pallet is supported solely by said abutments and not by said gear, with said first and second rollers being spaced from said rails a small vertical distance;
    clamping means carried by said support engageable with said pallet for clamping the pallet to said abutments when at a work station;
    indexing means on said support for rotating said gear and thereby moving said pallet between work stations, whereby said first rail cams said first roller upwardly thereby lifting the corresponding edge of said parallel to a transfer position and lowering said second rollers to engage said second rail, and said pallet being lifted out of engagement with said abutments, resulting in the pallet and its workpiece being carried by said rails and not by said gear, as said gear is rotated to move said pallet to the next work station;
    radial depending end flanges at the ends of each sector, said sectors being arranged end to end in a circle, the end flanges of adjacent sectors being in lateral engagement;
    opposite ends of each sector having upwardly opening radial recesses defining a ledge;
    a radial spanner plate nested upon ledges between a pair of adjacent sectors;
    and fasteners securing said spanner plates to said sectors respectively;
    said rails comprising a series of arcuate sectors arranged end to end and interconnected;
    a pair of aligned sectors of said first rail at each work station having end portions spaced apart;
    said end portions being recessed downwardly defining a cam recess in said first rail at said stations vertically spaced from and loosely receiving said first roller spacing said roller from said first rail;
    downward movement of said first roller partly into said cam recess tilting said pallet and lifting the corresponding second rollers above said second rail.

2. In the machine tool of claim 1, a plurality of fasteners extending between and securely interconnecting the end flanges of adjacent sectors.

3. In the machine tool of claim 1, a sub-base mounted upon a floor surface at each work station, underlying and mounting said support and secured to an adjacent support sector, said assembled and interconnected sectors as a unit spanning said sub-bases.

4. In a machine tool, a circular support having an upper support surface and comprising a series of separable arcuate sectors with radial ends;

an annular gear overlying and being spaced from said support surface;
a plurality of rollers carried by said support and engaging the undersurface of said gear to support the gear for rotation about a vertical axis;
first and second annular rails on said support surface, one rail on each side of said gear;
said first rail having a cam surface;
there being a plurality of spaced work stations located around said support;
a pallet for supporting a workpiece and movable through said work stations;
means connecting said pallet to said gear for rotational movement, yet accommodating limited relative vertical and horizontal movement therebetween;
a first roller carried by the underside of said pallet intermediate its ends on one side thereof and engageable with said first rail;
a pair of longitudinally spaced second rollers carried by the underside of said pallet adjacent its ends upon the other side thereof and engageable with said second rail;
a plurality of spaced abutments mounted on said support at each station, and engageable with said pallet when at a work station whereby said pallet is supported solely by said abutments and not by said gear, with said first and second rollers being spaced from said rails a small vertical distance;
clamping means carried by said support engageable with said pallet for clamping the pallet to said abutments when at a work station;
indexing means on said support for rotating said gear and thereby moving said pallet between work stations, whereby said first rail cams said first roller upwardly thereby lifting the corresponding edge of said pallet to a transfer position and lowering said second rollers to engage said second rail, and said pallet being lifted out of engagement with said abutments, resulting in the pallet and its workpiece being carried by said rails and not by said gear, as said gear is rotated to move said pallet to the next work station;
radial depending end flanges at the ends of each sector, said sectors being arranged end to end in a circle, the end flanges of adjacent sectors being in lateral engagement;
opposite ends of each sector having upwardly opening radial recesses defining a ledge;
a radial spanner plate nested upon ledges between a pair of adjacent sectors;
fasteners securing said spanner plates to said sectors respectively;
said indexing means being arranged upon one side of said annular gear;
there being a pair of spaced apertures upon the top of each sector upon the other side of said gear;
a roller mount of cylindrical form nested in each aperture;
a backup roll journaled upon a vertical axis upon said roller mount;
an arcuate mount flange on said roller mount overlying said support sector;
and a series of fasteners adjustably securing said flange thereto;
said backup rolls guidably engaging said annular gear inwardly thereof for constraining rotary movements thereof upon a fixed radius.

5. In a machine tool, a circular support having an upper support surface and comprising a series of separable arcuate sectors with radial ends;
an annular gear overlying and being spaced from said support surface;
a plurality of rollers carried by said support and engaging the undersurface of said gear to support the gear for rotation over a vertical axis;
first and second annular rails on said support surface, one rail on each side of said gear;
said first rail having a cam surface;
there being a plurality of spaced work stations located around said support;
a pallet for supporting a workpiece and movable through said work stations;
means connecting said pallet to said gear for rotational movment, yet accommodating limited relative vertical and horizontal movement therebetween;
a first roller carried by the underside of said pallet intermediate its ends on one side thereof and engageable with said first rail,
a pair of longitudinally spaced second rollers carried by the underside of said pallet adjacent its ends upon the other side thereof and engageable with said second rail;
a plurality of spaced abutments mounted on said support at each station, and engageable with said pallet when at a work station whereby said pallet is supported solely by said abutments and not by said gear, with said first and second rollers being spaced from said rails a small vertical distance;
clamping means carried by said support engageable with said pallet for clamping the pallet to said abutments when at a work station;
indexing means on said support for rotating said gear and thereby moving said pallet between work stations, whereby said first rail cams said first roller upwardly thereby lifting the corresponding edge of said pallet to a transfer position and lowering said second rollers to engage said second rail, and said pallet being lifted out of engagement with said abutments, resulting in the pallet and its workpiece being carried by said rails and not by said gear, as said gear is rotated to move said pallet to the next work station;
radial depending end flanges at the ends of each sector, said sectors being arranged end to end in a circle, the end flanges of adjacent sectors being in lateral engagement;
opposite ends of each sector having upwardly opening radial recesses defining a ledge;
a radial spanner plate nested upon ledges between a pair of adjacent sectors;
fasteners securing said spanner plates to said sectors respectively;
said means interconnecting said pallet and gear including a pair of longitudinally spaced upright transport pins mounted upon said annular gear;
their upper ends being tapered inwardly;
there being an upright bore in said pallet terminating in a counter-bore defining a shoulder;
a bushing within said counter-bore mounted upon said shoulder, cooperatively receiving a transport pin;
there being a circular recess on the top of said pallet of a diameter greater than and coaxial to said counterbore;

and a cover disc nested within said recess and secured to said pallet overlying and retainingly engaging said bushing;

there being a pair of longitudinally spaced bushings upon said pallet cooperatively receiving said pins respectively, whereby said pallets are adapted for vertical and lateral movements relative to said transport pins at the same time maintaining a continuous drive relation between said pins and said pallet.

6. In the machine tool of claim 1, there being a central radial slot through each support sector;

there being a pair of recessed radial ledges in said sector upon opposite sides of said slot;

the mounting of each said gear support roller including an axle support plate within said slot overlying and secured to said ledges;

and an axle extending radially through the axle support plate, said roller being journaled upon said axle.

7. In the machine tool of claim 1, said pallet having a workpiece support surface;

and a pair of longitudinally spaced workpiece locator pins mounted upon said pallet intermediate its ends and projecting above said workpiece support surface.

8. In the machine tool of claim 7, one locator pin having an annular tapered top, and the other having a top of polygonal shape, adopted for registry within corresponding openings in a workpiece upon said pallet.

9. In a machine tool, a circular support having an upper support surface and comprising a series of separable arcuate sectors with radial ends;

an annular gear overlying and being spaced from said support surface;

a plurality of rollers carried by said support and engaging the undersurface of said gear to support the gear for rotation about a vertical axis;

first and second annular rails on said support surface, one rail on each side of said gear;

said first rail having a cam surface;

there being a plurality of spaced work stations located around said support;

a pallet for supporting a workpiece and movable through said work stations;

means connecting said pallet to said gear for rotational movement, yet accommodating limited relative vertical and horizontal movement therebetween;

a first roller carried by the underside of said pallet intermediate its end on one side thereof and engageable with said first rail;

a pair of longitudinally spaced second rollers carried by the underside of said pallet adjacent its ends upon the other side thereof and engageable with said second rail;

a plurality of spaced abutments mounted on said support at each station, and engageable with said pallet when at a work station whereby said pallet is supported solely by said abutments and not by said gear, with said first and second rollers being spaced from said rails a small vertical distance;

clamping means carried by said support engageable with said pallet for clamping the pallet to said abutments when at a work station;

indexing means on said support for rotating said gear and thereby moving said pallet between work stations, whereby said first rail cams said first roller upwardly thereby lifting the corresponding edge of said pallet to a transfer position and lowering said second rollers to engage said second rail, and said pallet being lifted out of engagement with said abutments, resulting in the pallet and its workpiece being carried by said rails and not by said gear, as said gear is rotated to move said pallet to the next work station;

radial depending end flanges at the ends of each sector, said sectors being arranged end to end in a circle, the end flanges of adjacent sectors being in lateral engagement;

opposite ends of each sector having upwardly opening radial recesses defining a ledge;

a radial spanner plate nested upon ledges between a pair of adjacent sectors;

fasteners securing said spanner plates to said sectors respectively;

said first roller including a T shaped roller support secured to the undersurface of said pallet adjacent one side edge thereof;

a transverse axle shaft journaling said roller and projected through said roller support and secured thereto;

and fasteners interconnecting said pallet and roller support.

10. In the machine tool of claim 1, said second roller including a pair of longitudinally spaced roller supports secured to the undersurface of said pallet adjacent its other side edge;

one roller support being of inverted U-shape and the other roller support being of T-shape;

radial axle shafts extending transversely through said pair of roller supports mounting and journaling said second rollers respectfully;

fasteners interconnecting said pallet and said pair of roller supports;

one second roller being nested within the U-shaped roller support for positioning said one second roller upon one side of said second rail;

the other second roller being positioned outwardly of its T-shaped support for positioning said other second roller upon the other side of said second rail.

11. In the machine tool of claim 1, a pair of radially spaced wiper support arms secured upon the leading edge of said pallet;

a wiper support plate upon the end of each support arm juxtaposed over said first and second rails respectively, and arranged in vertical planes extending at an acute angle to said rails;

and a flexible wiper secured to each support plate and positioned to loosely engage said rails respectively.

12. In the machine tool of claim 11, said wipers being inclined inwardly and rearwardly respectively for removing any accumulating metal turnings and metal pieces from said rails in advance of pallet movement thereover.

13. In a machine tool, a circular support having an upper support surface and comprising a series of separable arcuate sectors with radial ends;

an annular gear overlying and being spaced from said support surface;

a plurality of rollers carried by said support and engaging the undersurface of said gear to support the gear for rotation about a vertical axis;

first and second annular rails on said support surface, one rail on each side of said gear;

said first rail having a cam surface;

there being a plurality of spaced work stations located around said support;

a pallet for supporting a workpiece and movable through said work stations;

means connecting said pallet to said gear for rotational movement, yet accommodating limited relative vertical and horizontal movement therebetween;

a first roller carried by the underside of said pallet intermediate its ends on one side thereof and engageable with said first rail;

a pair of longitudinally spaced second rollers carried by the underside of said pallet adjacent its ends upon the other side thereof and engageable with said second rail;

a plurality of spaced abutments mounted on said support at each station, and engageable with said pallet when at a work station whereby said pallet is supported solely by said abutments and not by said gear, with said first and second rollers being spaced from said rails a small vertical distance;

clamping means carried by said support engageable with said pallet for clamping the pallet to said abutments when at a work station;

indexing means on said support for rotating said gear and thereby moving said pallet between work stations, whereby said first rail cams said first roller upwardly thereby lifting the corresponding edge of said pallet to a transfer position and lowering said second rollers to engage said second rail, and said pallet being lifted out of engagement with said abutments, resulting in the pallet and its workpiece being carried by said rails and not by said gear, as said gear is rotated to move said pallet to the next work station;

radial depending end flanges at the ends of each sector, said sectors being arranged end to end in a circle, the end flanges of adjacent sectors being in lateral engagement;

opposite ends of each sector having upwardly opening radial recesses defining a ledge;

a radial spanner plate nested upon ledges between a pair of adjacent sectors;

fasteners securing said spanner plates to said sectors respectively;

the engagement of said pallet with said abutments comprising a plurality of spaced pairs of laterally spaced clamp projection feet depending from said pallet, each pair of feet having an abutment surface adapted for registry with an abutment respectively;

said clamping means including a reciprocal circular locator normally nested loosely between each pair of feet when said pallet is at a work station;

said locator including a depending locator rod of reduced diameter extending between said feet, through said abutment and through said support;

and a cylinder assembly aligned with each abutment underlying and secured to said support and including a reciprocal piston rod extending into said support and flexibly connected to said locator rod;

retraction of said locators operatively drawing said feet into securing engagement with said abutments;

said pallet having a workpiece support surface;

and a pair of longitudinally spaced workpiece locator pins mounted upon said pallet intermediate its end and projecting above said workpiece support surface.

14. In the machine tool of claim 13, the opposed interior surfaces of said feet at their lower ends being annularly tapered inwardly; the undersurface of said locators being tapered and adapted for cooperative retaining engagement with said projection feet tapered surfaces, said tapered surfaces shifting the pallet transversely for accurate registry with said support surface and into machining position.

15. In the machine tool of claim 13, a plurality of spaced circular bodies upon the underside of said pallet;

said pairs of clamp projection feet depending from a circular body and aligned with said abutments respectively;

each body having a top circular shank of reduced diameter relative to said body;

there being a series of laterally and longitudinally spaced undercut recesses within the bottom of said pallet corresponding to said abutments;

said circular shanks snugly nested within said undercut recesses respectively;

and fasteners securing said bodies to said pallet.

16. In the machine tool of claim 13, the securing of said cylinder assembly to said support including an annular boss depending from said support having a downwardly opening axial bore;

said cylinder assembly being secured to and depending from said boss, said piston rod extending into said boss.

17. In the machine tool of claim 13, and an elongated bushing extending through said support and abutment guidably receiving said locator rod.

18. In the machine tool of claim 13, the connection between said locator rod and piston rod including a connector cup having an axial aperture and an undercut slot;

a T-shaped head at the lower end of said connector rod loosely nested and flexibly retained within said connector cup;

and a sleeve axially depending from said connector cup receiving and adjustably secured to said piston rod.

19. In the machine tool of claim 18, the connection between said locator rod and piston rod including a connector cup within said boss and movable within its bore;

said connector cup having an axial aperture and an undercut slot;

a T-shaped head at the lower end of said rod within said boss loosely nested and flexibly retained within said connector cup, and a sleeve within said boss axially depending from said connector cup and receiving and adjustably secured to said piston rod.

* * * * *